(12) United States Patent
Ficco

(10) Patent No.: US 8,572,639 B2
(45) Date of Patent: Oct. 29, 2013

(54) BROADCAST ADVERTISEMENT ADAPTING METHOD AND APPARATUS

(75) Inventor: Michael Ficco, Silverspring, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1008 days.

(21) Appl. No.: 11/043,713

(22) Filed: Jan. 26, 2005

(65) Prior Publication Data

US 2005/0166224 A1 Jul. 28, 2005

Related U.S. Application Data

(62) Division of application No. 09/533,842, filed on Mar. 23, 2000, now abandoned.

(51) Int. Cl.
*H04H 60/32* (2008.01)
*H04N 7/16* (2011.01)

(52) U.S. Cl.
USPC .......................................................... 725/14

(58) Field of Classification Search
USPC ......... 725/9, 13–14, 32–46, 68, 116, 22, 109, 725/114, 47; 715/719; 709/217, 219; 386/95; 348/563
See application file for complete search history.

(56) References Cited

U.S. PATENT DOCUMENTS

| | | | | |
|---|---|---|---|---|
| 5,027,400 A * | 6/1991 | Baji et al. | | 725/116 |
| 5,485,221 A * | 1/1996 | Banker et al. | | 348/563 |
| 5,600,364 A * | 2/1997 | Hendricks et al. | | 725/9 |
| 5,600,366 A * | 2/1997 | Schulman | | 725/36 |
| 5,848,352 A * | 12/1998 | Dougherty et al. | | 725/110 |
| 5,945,988 A * | 8/1999 | Williams et al. | | 715/747 |
| 6,002,393 A * | 12/1999 | Hite et al. | | 715/719 |
| 6,088,722 A * | 7/2000 | Herz et al. | | 709/217 |
| 6,122,660 A * | 9/2000 | Baransky et al. | | 709/217 |
| 6,253,189 B1 * | 6/2001 | Feezell et al. | | 705/14.61 |
| 6,446,261 B1 * | 9/2002 | Rosser | | 725/34 |
| 6,530,083 B1 * | 3/2003 | Liebenow | | 725/46 |
| 6,698,020 B1 * | 2/2004 | Zigmond et al. | | 725/34 |
| 6,701,355 B1 * | 3/2004 | Brandt et al. | | 709/219 |
| 7,194,752 B1 * | 3/2007 | Kenyon et al. | | 725/22 |
| 7,222,354 B1 * | 5/2007 | Ching et al. | | 725/35 |
| 7,519,273 B2 * | 4/2009 | Lowthert et al. | | 386/95 |
| 2001/0013124 A1 * | 8/2001 | Klosterman et al. | | 725/36 |
| 2003/0135464 A1 * | 7/2003 | Mourad et al. | | 705/50 |
| 2004/0103429 A1 * | 5/2004 | Carlucci et al. | | 725/32 |
| 2006/0212900 A1 * | 9/2006 | Ismail et al. | | 725/34 |

* cited by examiner

*Primary Examiner* — Nasser Goodarzi
*Assistant Examiner* — An Nguyen

(57) ABSTRACT

Techniques of adapting an advertisement previously broadcast or in the process of being broadcast are disclosed. An advertisement selection factor is generated in order to adapt ads to a particular recipient. The advertisement selection factor can be derived from a database of information concerning the recipient and/or from data input by the recipient. The ad may be adapted in a variety of ways including replacing a broadcast ad segment with another segment. The replacement ad segment may be stored in a local device such as a set-top box or hardware card of a TV or PC and selected according to the advertisement selection factor. The replacement ad segment is synchronized with the on-going broadcast to produce a seamless ad. Alternatively, an ad processing can change audio or visual characteristics of the ad according to the ad selection factor. Such ad processing also includes dynamical texture mapping, object replacement, object addition, and audio/video data layering. The ad processing may also be combined with ad segment replacement. The result is a broadcast advertisement specifically targeted for a recipient and thereby likely to have a greater impact on that recipient's buying patterns. These techniques may also be applied to a variety of content such as sitcoms and sports shows to adapt the content to a particular recipient.

33 Claims, 5 Drawing Sheets

BROADCAST ADVERTISEMENT ADAPTING METHOD AND APPARATUS

This is a Divisional of U.S. application Ser. No. 09/533,842 filed Mar. 23, 2000 now abandoned.

FIELD OF THE INVENTION

This invention relates to methods and devices for adapting or otherwise changing a broadcast advertisement.

BACKGROUND OF THE INVENTION

Conventional broadcast advertisements for products and services are distributed to a wide audience in the hope that potential customers are included in the masses exposed to the advertisement. Such conventional broadcast advertisements are basically generalized billboards seeking maximum exposure to a wide audience. The general theory is that the broadcast advertisement will appeal to at least some of the recipients and affect their buying habits.

Another technique used in conventional broadcast advertisements is the concept of a target audience in which the broadcast advertisement is directed at the target audience in such a way as to affect that target audience's buying patterns and result in higher sales volumes of products and services being advertised.

However, conventional broadcast advertising techniques fail to individualize advertisements to a particular person. As mentioned above, sophisticated, conventional advertising techniques may be pitched toward a certain target audience. Nevertheless, this pitch is canned or otherwise predetermined in a recorded advertisement that is broadcast to a large group that may or may not include the desired target audience.

To date, no broadcast advertisement is constructed that is highly individualized to a particular person or persons, particularly when such individualization occurs on-the-fly or otherwise during the broadcasting process.

SUMMARY OF THE INVENTION

The present invention is generally directed at methods and devices for solving the above-mentioned problems.

More specifically, the present invention adapts a broadcast advertisement on-the-fly or otherwise as the broadcast advertisement is in the process of being broadcast to an audience. The broadcast advertisement is adapted to produce a highly-individualized advertisement directed at a particular recipient. Such a highly individualized advertisement should increase the impact of the advertisement and result in higher sales volumes.

The invention utilizes at least two basic ways of adapting the broadcast advertisement which may be utilized individually or in combination. Each of these ways of adapting a broadcast advertisement is preferably implemented in a set-top box or other presentation device.

A first way of adapting the advertisement is to replace a portion or segment of the advertisement with a selected ad segment. The replacement ad segment is selected in such a way as to better match the final advertisement to the particular recipient. A variety of ad segments can be prestored in a local device such as a set-top box and dynamically replaced or otherwise synchronized with the remainder of the broadcast. In this way, a seamless content stream is presented to the user where the advertisements are highly individualized to the recipient.

A second way of adapting the advertisement is to produce a highly individualized broadcast advertisement using image and/or sound processing techniques. In other words, the broadcast advertisement is configured via image and/or sound processing to produce a highly individualized advertisement that targets the particular recipient.

Before adapting the broadcast advertisement, the invention first generates an advertisement selection factor which is a formalized way of profiling the recipient of the advertisement. A variety of information can be gathered concerning the recipient such as buying patterns, tracking of previously viewed broadcast content, personal information concerning the recipient, as well as information input by the recipient.

Alternatively, the advertisement selection factor can be a user-driven factor in which the recipient enters information that may affect the advertisement selection factor. For example, the recipient can designate that he prefers humorous advertisements and dislikes classical music. In this way, the user himself can directly affect the advertisement selection factor and thereby view an adapted ad that is targeted to his preferences.

As mentioned above, this invention adapts broadcast advertisements that are in the process of being sent to a broadcast audience or have been previously sent and are queued for presentation. To provide a seamless content stream, the invention also synchronizes the adapted advertisement with the remainder of the broadcast content. Thus, the highly targeted commercial is inserted on cue into the broadcast stream being received by the individual consumer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
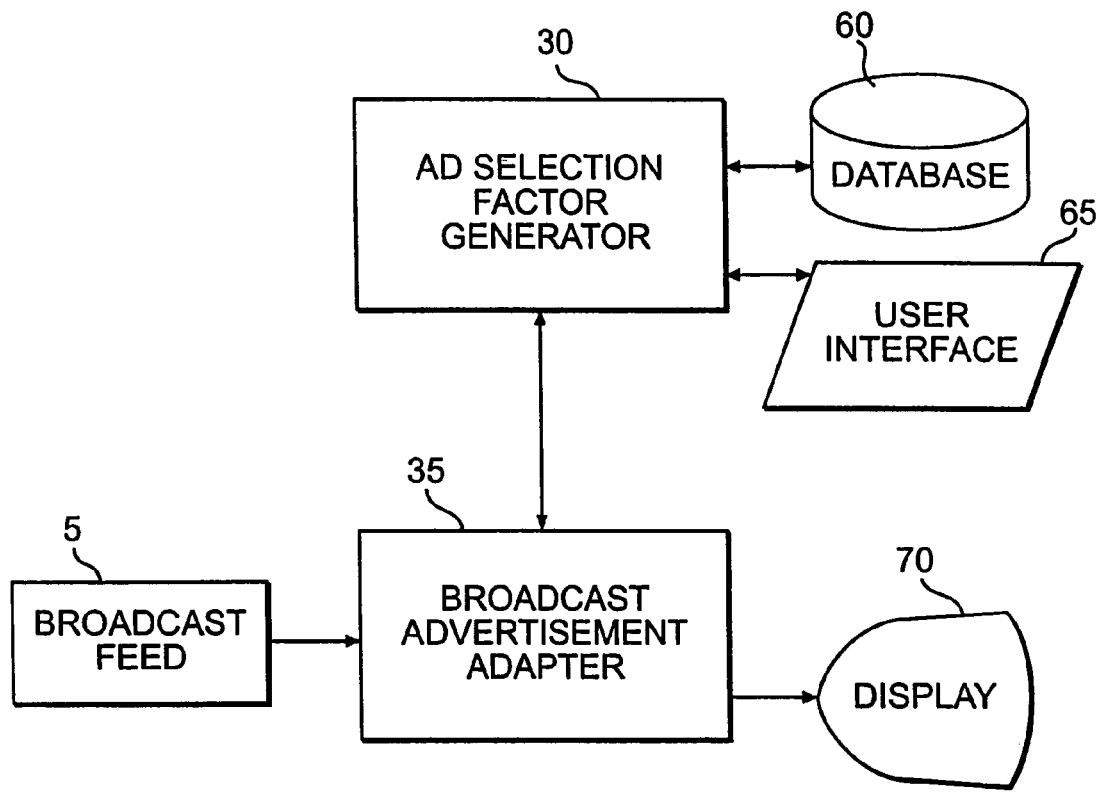
FIG. 1 is a block diagram of a broadcast advertisement adapting apparatus according to a first embodiment of the invention.

FIG. 1 illustrates a first embodiment of the invention. As shown therein, a broadcast feed 5 supplies broadcast content, including advertisements, to a broadcast advertisement adapter 35. The broadcast feed 5 may utilize any known or future developed broadcast media such as VHF, UHF, satellite, cable, fiber optic media, etc.

As further shown in FIG. 1, an ad selection factor generator 30 receives inputs from database 60 and user interface 65 and provides a control output to the broadcast advertisement adapter 35. The ad selection factor generator 30 may be co-located with the user or remotely located with, for example, the broadcast feed 5.

The broadcast advertisement adapter 35 performs one or more ad adaptation process(es) to the broadcast advertisement. For example, the ad may be adapted by selecting ad segments as further described in connection with FIG. 2 or by processing the broadcast advertisement as further described in connection with FIG. 3.

In general, the broadcast advertisement adapter 35 adapts the broadcast advertisement according to the control signal from the ad selection factor generator 30. More specifically, the ad selection factor generator 30 supplies an ad selection factor to the broadcast advertisement adapter 35 to control ad adaptation. Illustrative examples of ad adaptation are further described below.

A database 60 and user interface 65 may also be connected to the ad selection factor generator 30. The database 60 may be a local database or a remote database. The user interface 65 permits a user to enter data, selections, or other inputs that may affect the ad selection factor.

Generally, speaking the ad selection factor generator 30 may gather a variety of information from a variety of sources concerning a particular recipient of the broadcast advertisement. For example, this information may be retrieved from the database 60 or from the user interface 65. This information is utilized to generate an ad selection factor which is input by the broadcast ad adapter 35 to adapt the broadcast advertisement to a particular recipient. The result is sent to display 70 so that the recipient can view the adapted broadcast advertisement. Further operational details of the ad selection factor 30 are explained below in connection with the second embodiment of FIG. 2.

The ad adaptation performed by adapter 35 is preferably done on-the-fly or otherwise as the broadcast advertisement is in the process of being broadcast. The result is a seamless content stream with advertisements adapted to suit a particular recipient.

Figure 2:
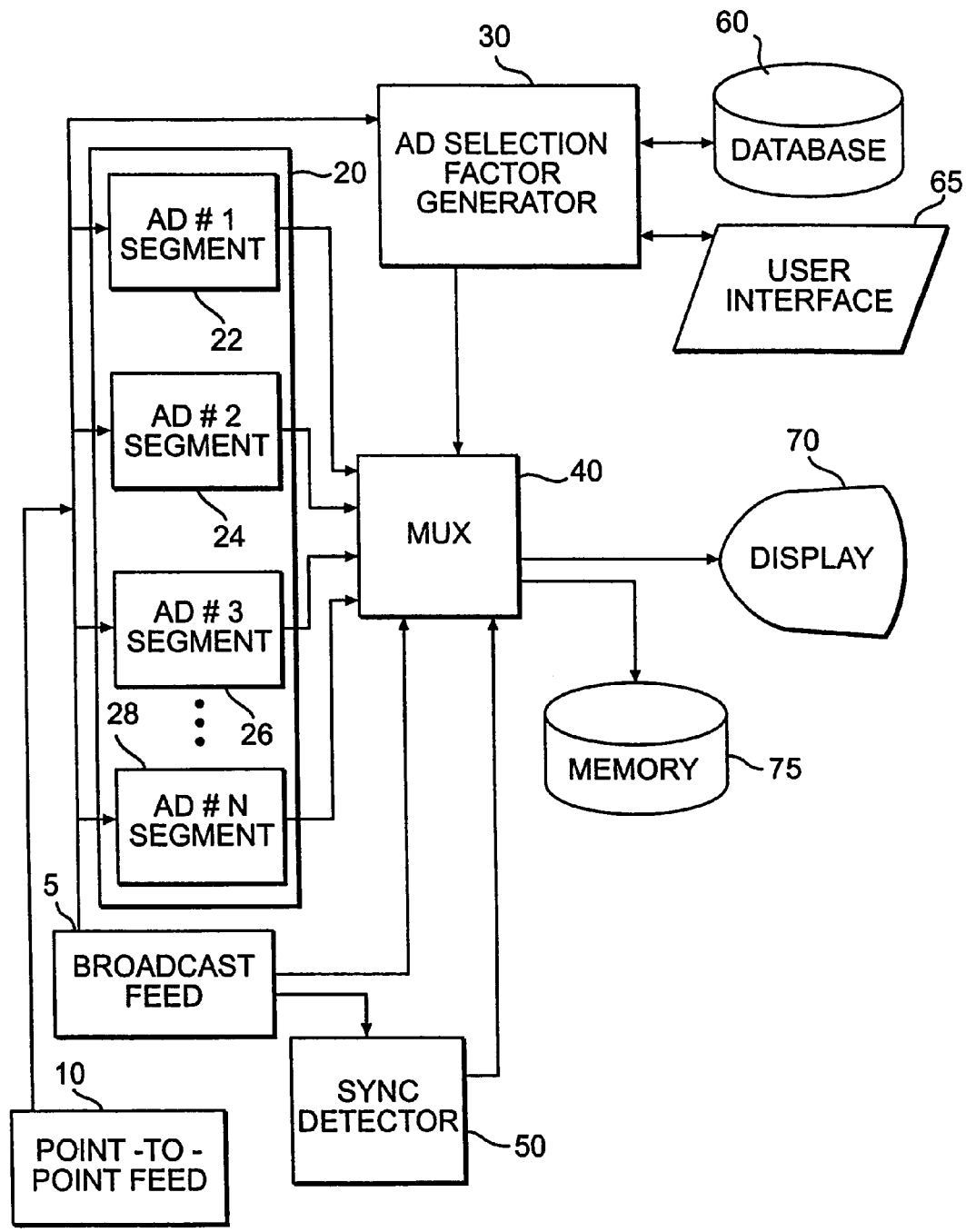
FIG. 2 is a block diagram of a broadcast advertisement adapting apparatus according to a second embodiment of the invention.

FIG. 2 illustrates a second embodiment of the invention. As shown therein, a broadcast feed 5 supplies broadcast content, including advertisements, to a multiplexer 40, memory device 20, and ad selection factor generator 30. The memory device 20 stores one or more ad segments such as ad segments 1-N in ad segment memories 22, 24, 26, 28. The memory device 20 may, in this way, pre-store ad segments for later presentation or act as a buffer when the broadcast stream rate is faster than the presentation rate.

As a minimum, the memory device 20 may store one ad segment. The ad segment memories 22-28 may be separate memory devices or integrated into a single memory device such as memory device 20. The memory device 20 may utilize a variety of media such as random access memory, hard disk drive, flash card, memory sticks, etc. Each of the ad segment memories 22-28 supply their respective ad segments to multiplexer 40.

A point-to-point feed 10 may also be connected to memory device 20 and ad segment memories 22-28 as further shown in FIG. 2. The point-to-point feed 10 may be constructed with a modem or other form of point-to-point connection. In this way, the point-to-point feed 10 can supply one or more ad segments to memory device 20 for storage therein and future selection by multiplexer 40. The point-to-point feed may also supply data to ad selection factor generator 30 as further shown in FIG. 2.

The ad selection factor generator 30 supplies a control input to multiplexer 40. More specifically, the ad selection factor generator 30 supplies an ad selection factor to multiplexer 40 to control ad segment selection as further described below. A database 60 and user interface 65 are also connected to the ad selection factor generator 30. As in the first embodiment, the database 60 may be a local database or a remote database. Also, the user interface 65 permits a user to enter data, selections, or other inputs that may affect the ad selection factor.

A synchronization detector 50 is also connected to the broadcast feed 5 and supplies a synchronization control output to multiplexer 40.

The output of multiplexer 40 is connected to a display device 70 such as a television. If the advertisement should includes an audio component, then the display 70 should include a speaker or other audio reproduction device. If the advertisement does not contain a video component, then display 70 need not include a video reproduction device.

The apparatus of FIG. 2 operates generally as follows. Further details of the methods of operation are explained below in connection with FIG. 5.

The embodiment of FIG. 2 is essentially an advertisement segment selection apparatus in which a broadcast advertisement is adapted by selecting one or more advertising segments and replacing at least a portion of the broadcast advertisement by the selected advertising segment.

Before selecting an ad segment, the ad segment may first be loaded into the memory device 20. The broadcast feed 5 supplies one or more advertising segments to the memory device 20 for storage in respective ad segment memories 22-28. Each of the ad segments includes an associated index value or other selection data which indicates the type, content, category, or other selection criteria that permits the multiplexer 40 to select the ad segment most appropriate to a particular ad selection factor.

This ad segment loading process can be accomplished in a variety of ways and at a variety of times. For example, the advertisement segments may be delivered over a variety of broadcast media which is indicated by the generalized broadcast feed 5. A convenient time in which to broadcast the advertising segments is during the off-air vertical blanking interval (VBI) of conventional NTSC television signals. Alternatively, the advertisement segments may be delivered during off-peak times when broadcast content is not typically being viewed on display 70. Another alternative is to utilize a designated channel or portion of the broadcast spectrum to deliver the advertising segments to memory device 20.

As an alternative to broadcast feed 5, the point-to-point feed 10 can also supply the advertising segments to memory device 20. As mentioned above, the point-to-point feed may comprise a modem which can connect to a host machine that delivers the advertising segments via the point-to-point communication path. Such a point-to-point feed also may encompass Internet connections wherein the advertising segments may be delivered by a host via the Internet to point-to-point feed 10 and thereby to memory device 20.

The ad selection factor generator 30 receives various inputs such as an input from database 60, user interface 65, broadcast feed 5, and/or point-to-point feed 10. Generally, speaking, the ad selection factor generator 30 gathers a variety of information concerning a particular recipient of the broadcast advertisement. For example, the database 60 may comprise a variety of information concerning the recipient including information such as credit card information, ads previously viewed by the recipient, tracking information that tracks the content and/or advertisements viewed by the recipient, geographical information, previously gathered information concerning the recipient's preferences, buying history, and personal details concerning the recipient such as ethnicity, religious affiliation, height, weight, and any other information potentially relevant to the individualization of an advertisement.

The user interface 65 may be utilized by the recipient to enter or otherwise designate one or more choices that affect the ad selection factor. For example, the recipient can input data such as a preference for humorous, serious, obscene, or even generally offensive advertisements. In other words, the recipient can assist in the advertisement adaptation and the ads to be delivered to him via broadcast media. Other inputs may include a preference for a type of music, language, color scheme, or other video or audio characteristics of an advertisement.

This user driven capability via user interface 65 and ad selection factor generator 30 may also be utilized to block certain advertisements. For example, a recipient affiliated with one particular religious organization may be highly offended by ads depicting or relating to sexual activity or reproduction health services. Upon a selection by the recipient, ads relating to such content would not be displayed and, instead, an ad selection factor generated can be utilized to select another, individualized ad that excludes such offensive content. In this way, the recipient is given a measure of control over the content being delivered to his television or display device 70.

The ad selection factor generator 30 utilizes some or all of the information available to it via database 60, user interface 65, broadcast feed 5, and/or point-to-point feed 10 to generate an ad selection factor appropriate to the recipient. Known or future developed advertisement targeting methods such as data mining can be utilized by the ad selection factor generator 30 to generate an ad selection factor tailored to the recipient of the ad.

Furthermore, the ad selection factor may comprise a variety of formats and content. In the simplest example, the ad selection factor could be a simple number designating one of the ad segments stored in the memory device 20. More complex examples of the ad selection factor include multiple components each of which corresponds to a particular category of consumers and has a numerical value rating the recipient within each category. By concatenating the various categorizations each with an index value, an appropriate ad segment stored in the memory device 20 may be appropriately selected. Indeed, the number of ad segments stored in memory device 20 may comprise hundreds, thousands, or more advertisements and be broken down into a variety of categories having a variety of organizational structures that permit selection by the ad selection factor and multiplexer 40.

The multiplexer 40 receives the ad selection factor from the ad selection factor generator 30 and selects one or more of the ad segments from respective one(s) of the ad segments memories 22-28.

In order to synchronize the selected ad segment with the remainder of the broadcast content, the synchronization detector 50 is supplied. This synchronization detector 50 receives an input from the broadcast feed 5 and outputs a control signal to multiplexer 40. For example, at least some broadcast advertisements begin with a particular tone or other synchronization signal that is detected by synchronization detector 50. Upon detection thereof, a control signal is sent to multiplexer 40 so that the selected advertisement segment can be synchronized with the remainder of the broadcast content.

The ad segment may have a length equal to the originally broadcast advertisement that it replaces. In this alternative, the synchronization detector 50 and multiplexer 40 swap the selected ad segment with the originally broadcasted advertisement to produce a seamless broadcast to the display 70.

Alternatively, the ad segment may have a length less than the time segment corresponding to the originally broadcast advertisement. In this alternative, the synchronization detector 50 detects the beginning of the originally broadcast advertisement and replaces the ad segment at a variable time within the time slot. In this alternative, the broadcast feed 5 supplies the synchronization detector 50 with the value of the variable time so that the selection and replacement process is seamless. Alternatively, this time value could be stored within the ad segment itself and supplied to multiplexer 40 for an appropriate synchronization of the ad segment within the originally broadcast advertisement segment. As a further alternative, the ad selection factor itself may include the appropriate time within the time slot in which to insert the selected ad segment. In this way, the multiplexer can produce a seamless broadcast advertisement, appropriately adapted to the recipient.

As further shown in FIGS. 1 and 2, the connection between the ad selection factor generator 30 and the database 60 is a bi-directional connection. The database 60 can be either a local or remote database. By utilizing this bi-directional link, the ad selection factor generator 30 can supply data concerning the recipient to the database. This could be quite useful, particularly for a remote database. In this way, the information entered via the user interface 65 as well as the particular advertisements selected and any subsequent channel selections may be relayed to the remote database 60. Thus, a selected advertisement segment which is turned off or otherwise deselected by changing the channel can be relayed back to the database 60 and utilized to further refine the ad selection factor generation process.

The database 60 can also be used to keep track of billing information. When an ad is adapted in a particular way, the ad segment(s) selected may be relayed back to database 60 so that the content provider can provide an accounting. For example, if the replacement ad segment is for a different product (company A's product) than the originally broadcast ad (company B's product), then company B may be given a credit or refund and company A may be debited.

Figure 3:
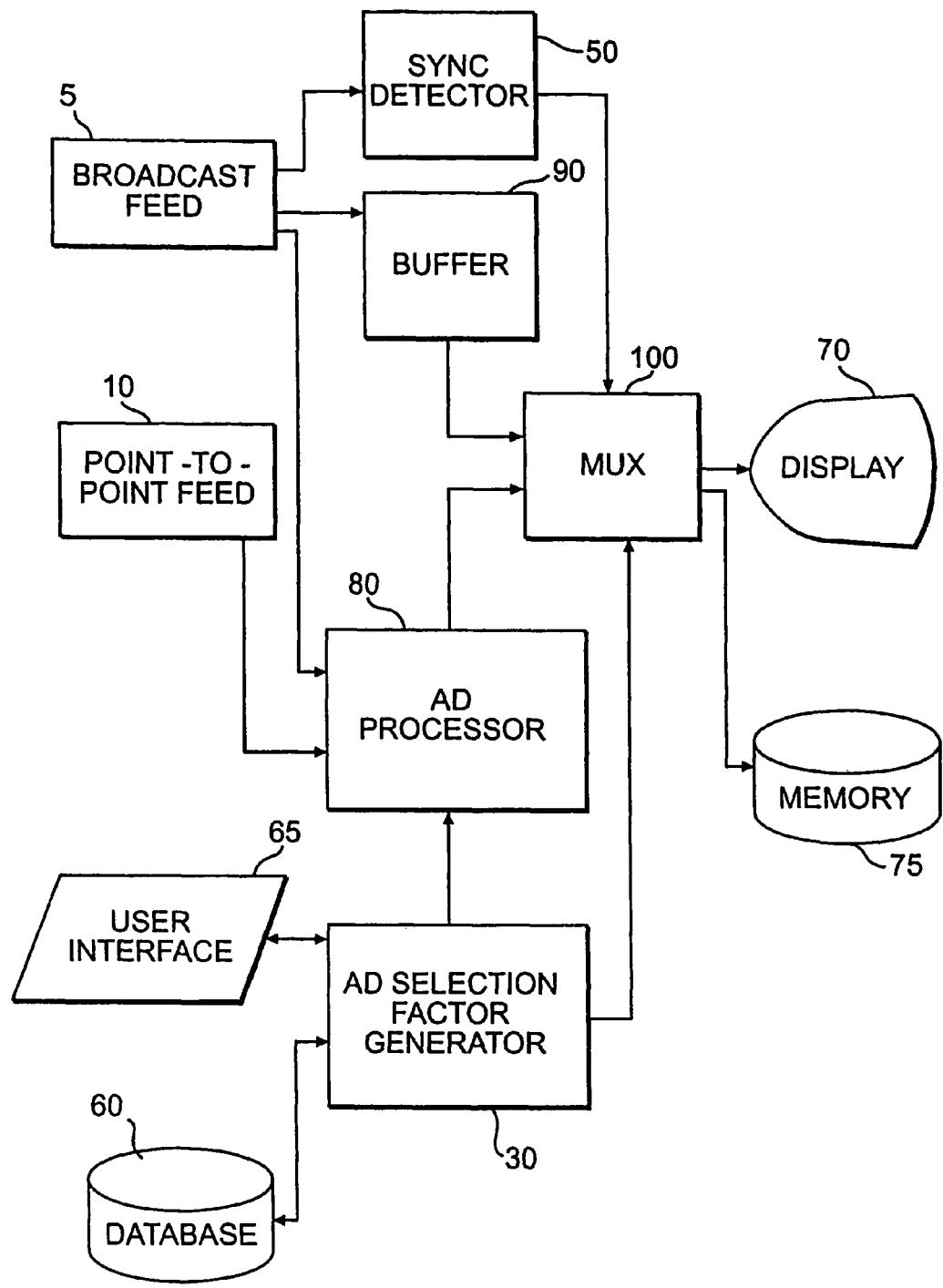
FIG. 3 is a block diagram of a broadcast advertisement adapting apparatus according to a third embodiment of the invention.

FIG. 3 illustrates a third embodiment of the invention wherein like reference numbers indicate like devices and their functionality.

Instead of an ad selection process, the apparatus of FIG. 3 generally performs ad processing in order to adapt the advertisement to the recipient. The main engine of the second embodiment is the ad processor 80 which receives inputs via the broadcast feed 5 and/or point-to-point feed 10 as well as a control input via ad selection factor generator 30. The ad processor 80 has an output to multiplexer 100.

Multiplexer 100 receives inputs from broadcast feed 5 via buffer 90. Multiplexer 100 also receives a synchronization signal via synchronization detector 50 that is connected to the broadcast feed 5. The multiplexer 100 outputs to display 70 as well as memory 75.

Although the internal details of the ad processor 80 are not essential to the present invention, the ad processor 80 may typically include such devices as an internal memory, central processing device, digital signal processing device, and internal bus architecture. The relevant information concerning the ad processor 80 is that the ad processor 80 is capable of processing the audio and/or visual components of a broadcast advertisement.

For example, ad processor 80 can change the color scheme of the broadcast advertisement. One example of a color scheme change is to process a color advertisement into a black and white advertisement by, for example, selecting only the luminance component. Conventional colorization techniques may also be utilized to transform a black and white advertisement to a color advertisement or to otherwise change the entire color scheme of the broadcast advertisement or portions thereof.

Other examples of ad processing include changing the language. For example, the text from a closed caption can be translated via conventional language translation applications to generate a translated closed caption. This translation can also be utilized to generate an audio translation of the original language. This can be done either with a speech synthesizer or by utilizing a separate audio ad segment as in the first embodiment. Further details of combining ad selection and ad processing are described below.

Further examples of ad processing include texture mapping in which the texture of an object, background, foreground, or other object in the broadcast advertisement is changed to another texture map.

The ad processor 80 can also adjust the sound level or other image characteristics such as brightness, hue, contrast, etc.

Another option is to perform dynamic texture mapping. For example, if it is determined that the recipient responds quite well to a particular model such as Kathy Ireland, then a dynamic texture map of Kathy Ireland can be utilized to replace the image of the original model. In this option, wire frame data or other such data may be transmitted to the ad processor 80 along with the broadcast advertisement to permit such dynamic texture mapping and seamlessly integrate the new dynamic texture into the originally broadcast advertisement.

Another option for ad processing includes object processing in which a selectable object can be added to, deleted from, or changed within the advertisement. For example, an actress can be a selectable object that can be added to ad advertisement. In this way, an advertisement can be populated with objects that may affect the recipient's buying habits. In this vein, the object may also be entirely replaced or deleted from the broadcast advertisement. For example, if it is determined that the recipient dislikes a certain model then the original model may be entirely deleted from the advertisement or replaced by another, more desirable model via the inventive ad processor architecture.

Still further options for ad processing include adding data to the broadcast advertisement. For example, a scrolling banner such as a stock ticker or sports scores can be layered on top of the broadcast advertisement. Other alternatives include adding hyperlinks or other data elements to the broadcast advertisement. A hyperlink to the corporation sponsoring the advertisement or to, for example, an ordering page could facilitate the actual purchase of the product or service being advertised.

Other options for ad processing include adding a frame or border or performing other cosmetic changes to the ad. The changes may be to the visual component, the audio component, or a combination of both.

The ad processor 80 may receive a variety of ad processing flags or other ad processing designation data via broadcast feed 5 and/or point-to-point feed 10. For example, one advertisement may be processed only by changing the color or sound while another may permit texture mapping. Appropriate flags or other designation data may be utilized to inform the ad processor 80 of the types of ad processing that may be performed on the particular advertisement. These data input paths may also supply additional data to enable ad processing such as selectable textures that may be mapped onto the broadcast advertisement; selectable objects that may be added to, deleted from, or changed within the advertisement; wire frame or other area selection data of an object that can be dynamically texture mapped; alternative audio segments for the advertisement; additional data items that may be added to the broadcast advertisement; or other audio and/or video characteristics of the advertisement that may be processed to generate an adapted advertisement.

The processing performed by the ad processor 80 may introduce a delay. For example, it may take a significant interval in which perform the dynamic texture mapping. If such is the case, then the buffer 90 should be utilized to provide a seamless feed to the display 70. The buffer 90 should have a capacity equal to the maximum delay anticipated by the ad processor 80. In this modification, the main path of the content is from broadcast feed 5 to buffer 90 through multiplexer 100 and thereafter to display 70. When the synchronization detector 50 detects the synchronization signal within the broadcast content signifying the start of an adaptable broadcast advertisement, an appropriate signal is sent to multiplexer 100. In this way, multiplexer 100 can synchronize the processed ad from ad processor 80 with the remainder of the broadcast content and thereby produce a seamless broadcast to the display 70.

Of course, if the ad processor 80 is fast enough to only introduce an insubstantial delay, then buffer 90 would be unnecessary. In this event, the synchronization detector 50 would merely synchronize the processed ad from ad processor 80 with the remainder of the broadcast content in conjunction with the multiplexer 100 to produce a seamless broadcast to display 70.

Furthermore, the buffer 90 may be utilized in other, alternative manners. As mentioned above, the invention may resolve a nominal presentation delay introduced by the invention by utilizing buffer 90. More specifically, at least a portion of the broadcast may be buffered by buffer 90 in order to synchronize adapted advertisement(s) with the remainder of the content stream. Such buffering may also compensate for differences between content feed rate and presentation rate whatever the cause. The buffer 90 could also be utilized to pause the broadcast for later on-demand viewing.

As mentioned above, the second and third embodiments may be combined. For example, an ad segment may be selected according to the second embodiment and the selected ad further processed by the ad processor 80 of the third embodiment. In this combination, the output from multiplexer 40 would be supplied to the ad processor 80 for further processing thereby. In this way, the selected ad segment can enjoy the further adaptation by ad processor 80 to produce an even-more individualized advertisement for the recipient.

Figure 4:
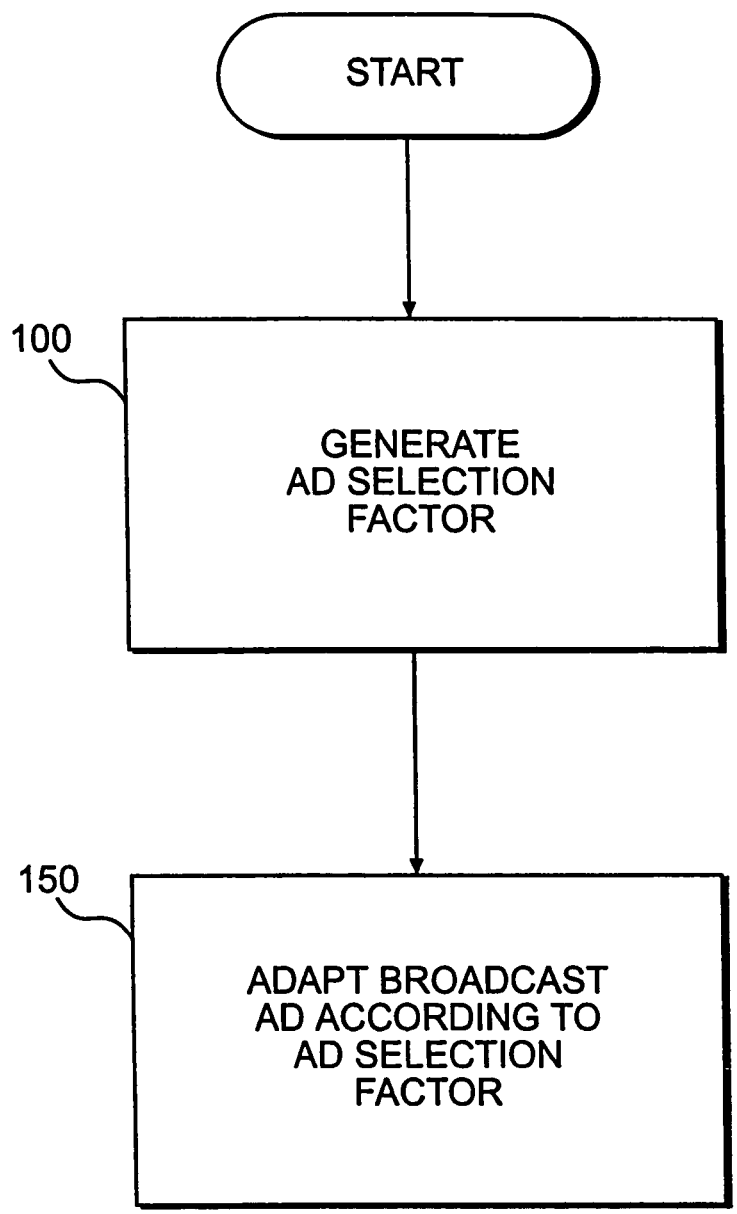
FIG. 4 is a high-level flowchart of the inventive methods of adapting a broadcast advertisement.

FIG. 4 is a high-level flowchart of the inventive methodologies. The method of FIG. 4 begins with step 100 that generates the ad selection factor. Any of the techniques described above may be utilized for step 100. Next, step 150 adapts the broadcast advertisement according to the ad selection factor. Again, any of the techniques described above may be utilized to adapt the ad including ad segment selection and/or ad processing.

Figure 5:
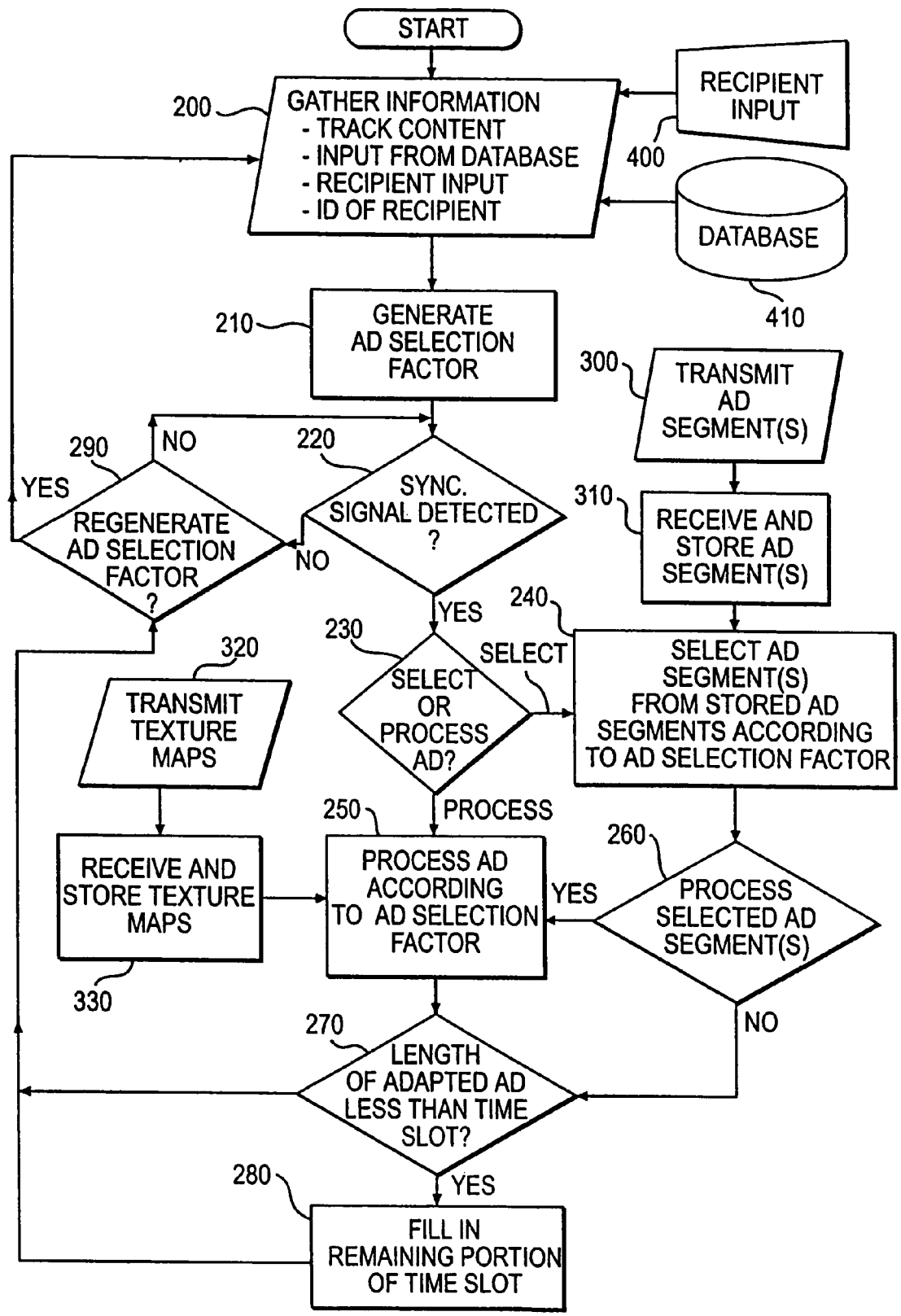
FIG. 5 is a more-detailed flowchart of the inventive methods of adapting a broadcast advertisement.

FIG. 5 further illustrates the inventive methodologies for adapting an advertisement. The system of FIG. 3 is capable of performing both ad selection and ad processing according to the second and third embodiments.

More particularly, the method of the invention begins with gathering information in step 200. As mentioned above, gathering information includes processes such as tracking the content selected by the recipient in the past and present, inputting from a database 410, and inputting data from the recipient via recipient input 400.

Also, learning the identity of the recipient may be part of the gathering information step 200. For example, the user interface can be utilized to gather information concerning the identity of the recipient. In addition, the recipient may be either a single person or a group of persons. If a group of persons comprises the recipient, then the advertisement adaptation method would be most effective if the group shares common traits or features or is otherwise affected by ad adaptation in a similar manner. Preferably, the identification is of who is watching the displays generated by the invention at the present time.

After gathering information relating to the recipient, the next step 210 is to generate the ad selection factor. Details of the ad selection factor generation process are described above in connection with the second embodiment of FIG. 2 and will not be repeated here.

Thereafter, the method decides whether the synchronization signal has been detected. If so, then a further choice is made in step 230 as to whether the broadcast advertisement is being adapted according to the selection or processing embodiments.

If ad selection is being performed, then step 240 performs the ad selection process from ads stored in the memory device 20 according to the ad selection factor from ad selection factor generator 30. Thereafter, a further decision is made as to whether the selected ad should be further processed to further adapt the ad to the recipient.

If the advertisement (original broadcast ad or the broadcast already adapted by the selection process) is to be processed, then step 250 performs the ad processing according to the ad selection factor.

After processing the ad in step 250, step 270 decides whether the length of the adapted ad is less than the time slot assigned to the originally broadcasted ad. This may be the case when, for example, the ad segment selected by step 240 has a length less than the entire, original broadcast advertisement. If so, then the remaining time slot must be filled in by step 280. This fill-in process may be performed by selecting another advertisement or by repeating the adapted advertisement until the time slot is filled.

The process is iterative as indicated by the flow from step 280 to step 290 where a decision is made as to whether to regenerate the ad selection factor. If not, then the method returns to step 220 to decide whether the synchronization signal has been detected. If no synchronization signal has been detected, then the flow returns to decision step 290 to again to decide whether to regenerate the ad selection factor. If yes, then the process loops back to the gathering information step 200 and the process begins anew. In this way, the ad selection factor can be dynamically updated, learned or otherwise regenerated.

The above description and flowchart of FIG. 5 is actually a combination of two methods which may also be utilized individually. The two basic methods are ad selection and ad processing, both of which are considered ad adaptation.

By using a subset of the FIG. 3 flowchart, either of the two basic methods may be utilized individually.

For example, the ad processing method would utilize steps 200, 210, 220, skip step 230, and continue with steps 320, 330, 250, 270, 280 and 290. Also, the ad selection method would utilize steps 200, 210, 220, skip step 230, and continue with steps 300, 310, 240, skip step 260 and continue with steps 270, 280 and 290.

Furthermore, steps 270 and 280 are considered optional particularly if the length of the adapted ad is substantially equal to the time slot of the original broadcast ad.

Step 290 is also considered optional. The regeneration of the ad selection factor is not necessary to the inventive methods but does enhance ad selection factor by learning or otherwise adapting the ad selection factor. If step 290 is eliminated, then the flow would proceed from step 280 to step 220.

A few examples of advertisement adaptation are presented below. These examples are not limitative of the invention, but are merely illustrative examples that further illustrate some of the many applications of the invention.

A national broadcast feed typically includes local advertisement segments. To key the local ad, a tone or other suitable event notification is utilized so that the local station may insert the local advertisement. It is noted that this local advertisement is not tailored or otherwise adapted to a recipient, but is instead a pre-recorded, local advertisement broadcast to a mass, local audience.

By applying the invention, this local ad may be adapted. For example, a selected advertisement segment may be substituted for the local ad according to the first embodiment. One example is that instead of an advertisement for a General Motors® product, an ad segment for the closest local dealer to the recipient can be selected and substituted for all or a portion of the originally broadcasted advertisement. In this way, the ad is highly tailored to the recipient and he receives an advertisement directly from the closest General Motors® dealer.

Another example is that the information gathered for the recipient tends to indicate that the particular recipient would buy more products if the advertisement contained nudity. For example, the gathered information indicates that the recipient is a heterosexual male of 23 years of age who fancies looking at nude women and whose product buying decisions would be affected by an ad that showed a nude woman. With this information in hand, a variety of ad segments that include nudity are loaded into the memory device 20.

When a broadcast advertisement for a mass audience having no nudity is being sent to this recipient, the ad selection factor generator 30 can utilize the marketing data concerning the recipient and select an ad segment containing nudity. In this way, a highly tailored and individualized ad segment can be substituted for the originally broadcast advertisement and displayed on that recipient's television. The recipient would be quite pleased to see nudity in his advertisements and may be much more motivated to buy the advertised product when compared with the originally broadcast advertisement where all of the actresses are fully clothed.

Such a highly individualized advertisement delivery system would also not offend those recipients who are offended by nudity. For example, the ad selection factor for a recipient that is a known member of the moral majority would deselect all advertisement segments that contained nudity. Instead, the advertisement selection factor would key advertisements segments stored in the memory device 20 that have religious or other highly moral themes. In this way, this second recipient would receive only those advertisements that are suited to his tastes and would thereby increase his likelihood to buy the advertised product or a service.

As is apparent from the above description, the present invention is highly advantageous in the advertising field. Some or all of the advertisements delivered to a particular recipient could be highly tailored, individualized, and targeted according to the recipient's profile and/or user driven information and data inputs. The potential effect on consumer buying habits and the advertising industry is enormous.

The invention may also be applied to adapt content other than advertisements. For example, a sitcom, movie, sports, gameshow or other content may be adapted by the invention to personalize the content to a particular individual. As with the advertisement adaptations, portions of content may be adapted rather the entire content.

As a particular example, a variety of endings for a sitcom could be taped by the shows producers. One of these endings could be substituted for the originally broadcast ending to thereby adapt the sitcom to a particular recipient. Another example, in the sports arena, is a player substitution. Like the Kathy Ireland substitution described above, the invention could substitute a particular recipient's favorite sports hero for a player in a broadcast sports show. For example, Johnny Unitas could be texture mapped onto a wireframe model of the original quarterback in a broadcast football game. In this way, the recipient could see his favorite sports hero reanimated to play another game.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of adapting broadcast content in the process of being broadcast to an audience, comprising:
    receiving the broadcast content at a local device associated with a display on which the broadcast content is to be displayed to a recipient, the broadcast content including a broadcast advertisement;
    generating a selection factor, wherein the selection factor corresponds to the recipient of the broadcast content based on information relating to the recipient;
    selecting an advertising segment adapted to the recipient based on the selection factor;
    detecting whether the adapted advertising segment has a first duration less than a second duration of a time slot allocated to the broadcast advertisement; and
    in response to detecting that the first duration is less than the second duration:
        determining a variable time from a beginning of the time slot allocated to the broadcast advertisement; and
        replacing at least a portion of the broadcast advertisement with the adapted advertising segment at the variable time within the time slot allocated to the broadcast advertisement.

2. The method according to claim 1, further comprising:
    synchronizing the adapted broadcast content with other broadcast content being broadcast to the recipient.

3. The method according to claim 1, further comprising:
    locally gathering information relating to a recipient of the broadcast content.

4. The method according to claim 3, the gathering the information relating to the recipient including tracking content selected by the recipient.

5. The method according to claim 3, the gathering the information relating to the recipient including receiving information from a database.

6. The method according to claim 3, the gathering the information relating to the recipient including receiving information from the recipient via a user interface device.

7. The method according to claim 1, further comprising adapting the broadcast advertisement according to the selection factor by changing at least one of a length, visual, or audio characteristic of the broadcast advertisement.

8. The method according to claim 1, further comprising:
    storing a plurality of selectable advertising content segments in a device local to the recipient.

9. The method according to claim 8, further comprising:
    transmitting the plurality of selectable advertising content segments to the local device.

10. The method according to claim 8, wherein the adapted advertising segment is adapted by assembling content from the plurality of advertisement content segments according to the selection factor.

11. The method according to claim 1, wherein the selecting the advertising segment comprises selecting an entire broadcast advertisement according to the selection.

12. The method according to claim 1, further comprising adapting the broadcast advertisement according to the selection factor by mapping at least one selectable texture onto the broadcast advertisement according to the selection factor.

13. The method according to claim 1, further comprising adapting the broadcast advertisement according to the selection factor by mapping at least one selectable texture onto at least one selectable object of the broadcast advertisement according to the selection factor.

14. The method according to claim 1, further comprising adapting the broadcast advertisement according to the selection factor by replacing a selectable object of the broadcast advertisement according to the selection factor.

15. The method according to claim 1, further comprising adapting the broadcast advertisement according to the selection factor by adding at least one selectable object to the broadcast advertisement according to the selection factor.

16. The method according to claim 1, further comprising adapting the broadcast advertisement according to the selection factor by adding audio or video data to the broadcast advertisement.

17. The method according to claim 1, wherein the recipient of the broadcast content is an individual.

18. The method according to claim 1, wherein the selection factor corresponds to an individual.

19. The method according to claim 1, wherein the recipient of the broadcast content is a group of individuals.

20. The method according to claim 1, wherein the selection factor corresponds to a group of individuals.

21. The method according to claim 1, further comprising:
    adjusting the selection factor to learn or accommodate changes in the recipient.

22. The method according to claim 1, the selection factor including a plurality of components categorizing the recipient, wherein generating the selection factor includes using at least one of the categorizing components.

23. The method according to claim 1, further comprising, in response to determining that the first duration is less than the second duration, selecting a second advertising segment based on the selection factor for insertion into the time slot allocated to the broadcast advertisement at a second variable time from the beginning of the time slot later than the first variable time from the beginning of the time slot.

24. The method according to claim 23, wherein the variable time is received with the broadcast content.

25. The method according to claim 23, wherein the variable time is stored with the advertising segment.

26. The method according to claim 23, wherein the variable time is included in the selection factor.

27. An apparatus for adapting broadcast content in the process of being broadcast, wherein the broadcast content includes a broadcast advertisement, comprising;
- a selection factor generator associated with a display on which the broadcast content is to be displayed, the selection factor generator to generate a selection factor corresponding to a recipient of the broadcast content and based on information relating to the recipient; and
- a content processor coupled to a broadcast feed and a selection factor input; and
- a selector to select an advertising segment adapted to the recipient based on the selection factor;
- a comparator to determine whether the adapted advertising segment has a first duration less than a second duration of a time slot allocated to the broadcast advertisement; and
- a detector to determine, in response to the first duration being less than the second duration, a variable time from a beginning of the time slot allocated to the broadcast advertisement,
- wherein the content processor is to replace at least a portion of the broadcast advertisement with the adapted advertising segment at the variable time within the time slot allocated to the broadcast advertisement.

28. The apparatus according to claim 27, wherein the broadcast content has an associated synchronization signal, the apparatus further comprising:
- a buffer device operatively connected to said broadcast feed; wherein the detector is to detector the synchronization signal, the content processor is to process the broadcast content from the broadcast feed according to selection factor and the buffer device is to synchronize the processed content with a remainder of the broadcast content.

29. The apparatus according to claim 27, wherein the selector, in response to the first duration being less than the second duration, is to select a second advertising segment based on the selection factor for insertion into the time slot allocated to the broadcast advertisement at a second variable time from the beginning of the time slot later than the first variable time from the beginning of the time slot.

30. The apparatus according to claim 29, wherein the variable time is received with the broadcast content.

31. The apparatus according to claim 29, wherein the variable time is stored with the advertising segment.

32. The apparatus according to claim 29, wherein the variable time is included in the selection factor.

33. A method of adapting broadcast content in the process of being broadcast to an audience, comprising:
- receiving the broadcast content at a local device associated with a display on which the broadcast content is to be displayed to a recipient, the broadcast content including a broadcast advertisement;
- generating a selection factor, wherein the selection factor corresponds to the recipient of the broadcast content and is based on information relating to the recipient;
- selecting a first advertising segment adapted to the recipient based on the selection factor;
- detecting whether the adapted advertising segment has a first duration less than a second duration of a time slot allocated to the broadcast advertisement; and
- in response to detecting that the first duration is less than the second duration:
  - selecting a second advertising segment adapted to the recipient based on the selection factor;
  - inserting the first advertising segment into the time slot allocated to the broadcast advertisement; and
  - inserting the second advertising segment into the time slot allocated to the broadcast advertisement after a period of time corresponding to the duration of the first advertising segment.

* * * * *